US011879111B2

(12) United States Patent
Hubig et al.

(10) Patent No.: US 11,879,111 B2
(45) Date of Patent: Jan. 23, 2024

(54) DETERGENT COMPOSITIONS, CLEANING SYSTEMS AND METHODS OF CLEANING COSMETIC AND OTHER SOILS

(71) Applicant: ECOLAB USA INC., Saint Paul, MN (US)

(72) Inventors: Stephan M. Hubig, Saint Paul, MN (US); Susan Maloney Viall, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 257 days.

(21) Appl. No.: 17/301,125

(22) Filed: Mar. 25, 2021

(65) Prior Publication Data

US 2021/0301220 A1 Sep. 30, 2021

Related U.S. Application Data

(60) Provisional application No. 63/000,530, filed on Mar. 27, 2020.

(51) Int. Cl.
*C11D 1/75* (2006.01)
*C11D 1/72* (2006.01)
(Continued)

(52) U.S. Cl.
CPC .................. *C11D 1/75* (2013.01); *C11D 1/72* (2013.01); *C11D 1/722* (2013.01); *C11D 3/044* (2013.01);
(Continued)

(58) Field of Classification Search
CPC .... C11D 1/72; C11D 1/75; C11D 3/33; C11D 3/30; C11D 3/361; C11D 3/3757;
(Continued)

(56) References Cited

U.S. PATENT DOCUMENTS 5,871,590 A 2/1999 Hei et al.
6,245,728 B1 6/2001 Robbins et al.
(Continued)

FOREIGN PATENT DOCUMENTS

CN 104662141 B 6/2018
EP 0550636 B1 9/1995
(Continued)

OTHER PUBLICATIONS

Du et al., "Preparation and properties of microemulsion detergent with linear medium chain fatty alcohols as oil phase", Journal of Molecular Liquids, vol. 223 pp. 805-810, Nov. 2016.
(Continued)

*Primary Examiner* — Gregory R Delcotto
(74) *Attorney, Agent, or Firm* — McKee, Voorhees & Sease, PLC

(57) ABSTRACT

Cleaning systems employing detergent compositions in combination with builders comprising alkalinity and chelants are provided. The detergent compositions include amine oxide surfactant and alcohol ethoxylate surfactant blends having a mixture of chain lengths and branching provided. The detergent compositions are particularly efficacious for flexible cleaning systems for cosmetic and other soils as they provide the benefit of separate dosing of surfactants in the detergent from alkalinity sources in a builder composition. Methods of using the detergent compositions and/or the cleaning systems are provided.

18 Claims, 10 Drawing Sheets
(4 of 10 Drawing Sheet(s) Filed in Color)

(51) Int. Cl.

| | |
|---|---|
| ***C11D 1/722*** | (2006.01) |
| ***C11D 3/04*** | (2006.01) |
| ***C11D 11/00*** | (2006.01) |
| ***C11D 3/36*** | (2006.01) |
| ***C11D 3/33*** | (2006.01) |
| ***C11D 3/37*** | (2006.01) |
| ***C11D 3/39*** | (2006.01) |
| ***C11D 17/04*** | (2006.01) |

(52) U.S. Cl.
CPC ................ *C11D 3/33* (2013.01); *C11D 3/361* (2013.01); *C11D 3/3757* (2013.01); *C11D 3/3765* (2013.01); *C11D 3/3902* (2013.01); *C11D 11/0029* (2013.01); *C11D 11/0041* (2013.01); *C11D 17/043* (2013.01); *C11D 17/044* (2013.01); *C11D 17/045* (2013.01)

(58) Field of Classification Search
CPC ... C11D 3/3902; C11D 17/043; C11D 17/044; C11D 17/045; B08B 3/08; B08B 3/10
USPC ....... 510/296, 356, 439, 477, 480, 488, 499, 510/503, 505, 506, 421; 134/25.2, 42
See application file for complete search history.

(56) References Cited

U.S. PATENT DOCUMENTS

| | | | | |
|---|---|---|---|---|
| 6,506,717 | B1 | 1/2003 | Kott et al. | |
| 6,892,739 | B2 | 5/2005 | Merz et al. | |
| 2003/0087783 | A1* | 5/2003 | Somerville-Roberts | C11D 17/043 510/301 |
| 2003/0087784 | A1* | 5/2003 | Somervile-Roberts | B65D 81/3272 510/297 |
| 2003/0139317 | A1 | 7/2003 | Behler et al. | |
| 2010/0125046 | A1* | 5/2010 | Denome | C11D 17/045 510/277 |
| 2010/0190677 | A1* | 7/2010 | Esposito | C11D 3/3761 510/296 |
| 2011/0130462 | A1 | 6/2011 | Carter | |
| 2017/0166846 | A1* | 6/2017 | Boutique | C11D 17/043 |
| 2018/0223016 | A1 | 8/2018 | Tamareselvy et al. | |

FOREIGN PATENT DOCUMENTS

| | | | | |
|---|---|---|---|---|
| EP | 0885283 | B1 | 12/1998 | |
| EP | 1678284 | B1 | 9/2008 | |
| EP | 2134734 | B1 | 12/2009 | |
| EP | 2621456 | B1 | 8/2013 | |
| EP | 2857485 | A1 * | 4/2015 | C11D 1/83 |
| EP | 2935554 | B1 | 10/2015 | |
| JP | 201830955 | A | 3/2018 | |
| TW | 1637053 | B | 10/2018 | |
| WO | 9919439 | A1 | 4/1999 | |
| WO | WO-2009098660 | A1 * | 8/2009 | B65D 65/46 |
| WO | WO-2017131799 | A1 * | 8/2017 | C11D 17/04 |
| WO | 2018187683 | A1 | 10/2018 | |

OTHER PUBLICATIONS

Miller et al., "Amine Oxide/Alcohol Ethoxylate Blends: Zero-Phosphate, High-Performance, Hard-Surface Cleaners", JAOCS, vol. 72, No. 7, pp. 857-859, 1995.

"Cleaning of Cosmetic Equipment Landscape", patsnap, insights.patsnap.com, 36 pages, Aug. 8, 2019.

* cited by examiner

Soiled - 400 g toothpaste

2% Comm. Product A +
1% Comm. Product B +
0.5% Comm. Product C

2% Comm. Product D

6% Comm. Product A +
1% Comm. Product B +
1% Comm. Product C

Before Cleaning 10 minutes with Cleaning System

Following Water Rinse

Before Cleaning 10 minutes
Commercial Product E 20 minutes
Commercial Product E 30 minutes
Commercial Product E Following 30 minutes
Commercial Product E +
Water rinse 10 minutes +
Cleaning System Water rinse

DETERGENT COMPOSITIONS, CLEANING SYSTEMS AND METHODS OF CLEANING COSMETIC AND OTHER SOILS

CROSS-REFERENCE TO RELATED APPLICATION

This application claims priority under 35 U.S.C. § 119 to U.S. Provisional Application Ser. No. 63/000,530, filed on Mar. 27, 2020, which is herein incorporated by reference in its entirety including without limitation, the specification, claims, and abstract, as well as any figures, tables, or examples thereof.

FIELD OF THE INVENTION

Liquid detergent compositions with amine oxide surfactant and alcohol ethoxylate surfactant blends having a mixture of chain lengths and branching provide efficacious detergency for cosmetic and other soils, including without the use of solvents and alkalinity separately formulated in builder compositions. The concept of separate detergent and builder compositions provide the benefit of separate dosing of surfactants, which are costly components as compared to the builder components and allow modifications in alkalinity for particular soils and applications of use without requiring modification of the surfactant concentrations. Cleaning systems employing the detergent compositions in combination with builders comprising alkalinity and chelants are provided. Methods of using the detergent compositions and the cleaning systems are also provided.

BACKGROUND OF THE INVENTION

The cleaning of cosmetic soils, including cosmetic manufacturing equipment, presents challenges due to the variety of soils requiring distinct surfactant, chelant and/or alkalinity concentrations to effectively penetrate and emulsify such soils. There is also a variety of manufacturing equipment for all kinds of different cosmetics products that require such cleaning. The cosmetics industry most often uses alkaline or acidic cleaning products for its manufacturing equipment that are not equally performing on all kinds of cosmetics soils. As a result, a manufacturer who makes many different cosmetics products must either purchase many different cleaning products to effectively remove soils and/or achieves ineffective cleaning of all soils. In addition, the fast-moving cosmetics industry requires manufacturers to frequently modify existing products, which may also require modified cleaning products and procedures to avoid insufficient soil removal.

Often in the cosmetic industry there are simply insufficient cleaning and detergent compositions that allow use of surfactants and/or builders suited for a particular soil that are separate from an alkalinity source and/or do not employ a solvent system. As a result, there are not cost-effective cleaning and detergent compositions, as the alkalinity source is formulated with the surfactants and/or builders, often resulting in excess surfactants utilized to clean a soiled surface.

It is therefore an object of this disclosure to provide flexible cleaning systems and methods whereby detergent compositions and/or builder compositions can be formulated to provide surfactants and chelants in a detergent composition that is separate from alkalinity sources, allowing modifications in alkalinity for particular soils and applications of use without requiring modification of the surfactant and chelant concentrations.

It is a further object of the disclosure to provide efficacious liquid detergent compositions having an approximately neutral pH and comprising at least one amine oxide surfactant and a combination of at least two alcohol ethoxylate surfactants having a mixture of chain lengths and branching.

It is a further object of the disclosure to provide efficacious liquid detergent compositions for use in combination with an alkaline builder composition comprising an alkalinity source and at least one chelant and/or dispersant, and further optional use with additional boosters.

It is another object of this disclosure to provide methods of cleaning using a detergent composition and/or cleaning composition that allows manufacturing equipment for all kinds of different cosmetics products to be cleaned with a limited number of cleaning components that are mixed together at a point of use or on site for the cleaning process.

In still further objects of the disclosure to provide on-site dosing that is programmable and/or adjustable by a user to provide variable mixing of the detergent composition, builder composition and/or optional additional boosters for cleaning a particular soil(s), providing efficacious, cost-effective, and sustainable cleaning methods.

Other objects, aspects and advantages of this invention will be apparent to one skilled in the art in view of the following disclosure, the drawings, and the appended claims.

SUMMARY OF THE INVENTION

An advantage of the detergent compositions is the near-neutral pH of the composition providing the surfactants and the separation of the surfactant blends from the chelant blend and alkalinity source, allowing modifications in alkalinity and chelant concentrations for particular soils and applications of use without requiring modification of the surfactant concentrations. This advantage is still further provided in the methods of using the detergent compositions and the cleaning systems, whereby on-site dosing can be programmable and/or adjustable by a user to provide variable mixing of the detergent composition, builder composition and/or optional additional boosters for cleaning a particular soil(s), providing efficacious, cost-effective, and sustainable cleaning methods. In an embodiment, detergent compositions comprise an amine oxide surfactant; and at least two alcohol ethoxylate surfactants, wherein a first alcohol ethoxylate is a C8-C11 alcohol ethoxylate and a second alcohol ethoxylate is a C12-C20 alcohol ethoxylate, and wherein the ethoxylate surfactants comprise a mixture of linear and branched structures, wherein the pH of the detergent composition is from about 6 to about 8. In embodiments, the amine oxide is a dimethyl amine oxide, or an octyl, decyl, dodecyl, isododecyl, coconut, or tallow alkyl di-(lower alkyl) amine oxide. In embodiments, the first alcohol ethoxylate is linear and/or branched and has between about 4 and about 20 moles of ethylene oxide, and the second alcohol ethoxylate is linear and/or branched and has between about 6 and about 20 moles of ethylene oxide. In embodiments, the composition includes amine oxide in a weight-% based on actives from about 2 wt-% to about 40 wt-% of the composition, the C8-C11 alcohol ethoxylate comprises from about 2 wt-% to about 10 wt-% of the composition, and the C12-C20 alcohol ethoxylate comprises from about 8 wt-% to about 40 wt-% of the composition. In further embodiments, the composition is solvent free.

In embodiments, a cleaning system comprises a detergent composition as described according to any of the embodiments, and a builder composition comprising an alkalinity source and at least one chelant, wherein the detergent composition provides surfactants separate from the builder comprising the alkalinity source. In embodiments, the cleaning system further includes a booster.

In further embodiments, a method of cleaning cosmetic soils comprises providing the detergent composition as described according to any of the embodiments, or the cleaning system according to any of the embodiments, to a surface in need of cleaning; and contacting a surface in need of soil removal with the detergent composition or the cleaning system; and removing the cosmetic soils. In embodiments, the detergent composition is applied at a use solution concentration of from about 0.5% to about 8%.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 9A shows the vessel soiled with lipstick before any cleaning, FIG. 9B shows removal of soils after 10 minutes cleaning, and FIG. 9C shows removal of the soils following a water rinse of the vessel after the cleaning.

FIG. 10A shows the vessel soiled with lipstick before any cleaning, FIG. 10B shows removal of soils after 10 minutes cleaning with Commercial product E, FIG. 10C shows removal of soils after 20 minutes cleaning with Commercial product E, and FIG. 10D shows removal of the soils following 30 minutes cleaning with Commercial product E.

FIG. 11A shows the incomplete removal of lipstick soil with a water rinse after the 30 minutes with Commercial product E, FIG. 11B shows 100% cleaning efficacy of the same soiled vessel after only 10 minutes cleaning with the cleaning system, and finally FIG. 11C shows removal of the soils following a water rinse of the vessel after the cleaning in FIG. 11B.

Figure 1:
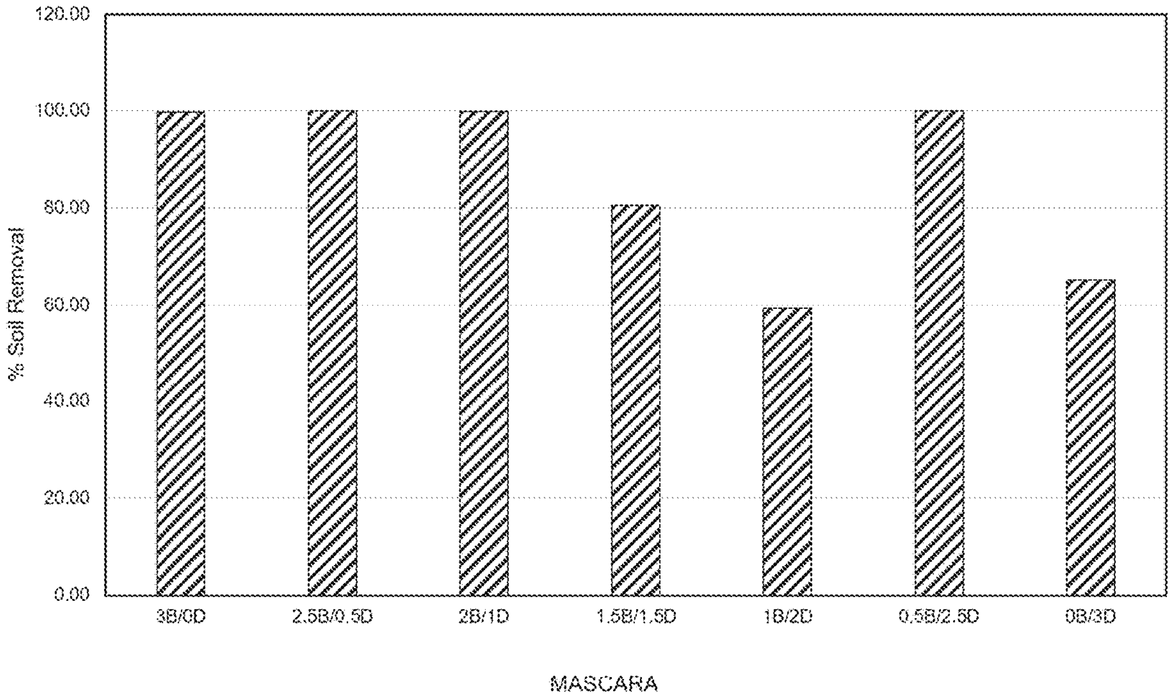
FIG. 1 depicts cleaning efficiencies (in % soil removal) for mascara soils at various dosage ratios of builder (B) and detergent (D) products of the cleaning system. The reported ratios, such as 2.5B/0.5D means the cleaning solution contains 2.5% builder and 0.5% detergent product.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

The embodiments are not limited to particular detergent compositions and/or cleaning systems employing the detergent compositions, which can vary and are understood by skilled artisans. It has been surprisingly found that the described detergent compositions, cleaning systems, and methods of using the same provide flexible cleaning compositions and methods of use that are tailored to particular soils in the cosmetic industry in a cost-effective and efficacious manner.

It is further to be understood that all terminology used herein is for the purpose of describing particular embodiments only, and it is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers within the defined range. Throughout this disclosure, various aspects are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments without undue experimentation, but the preferred materials and methods are described herein. In describing and claiming the embodiments, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%. In preferred embodiments the compositions include 0 wt-% of the component.

The term "surfactant" or "surface active agent" refers to an organic chemical that when added to a liquid changes the properties of that liquid at a surface.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions may comprise, consist essentially of, or consist of the components and ingredients as well as other ingredients described herein. As used herein, "consisting essentially of" means that the methods and compositions may include additional steps, components, or ingredients, but only if the additional steps, components, or ingredients do not materially alter the basic and novel characteristics of the claimed methods and compositions.

Detergent Compositions

According to embodiments, the detergent compositions include an amine oxide surfactant and a blend of at least two alcohol ethoxylate surfactants, containing both short and long chain alcohol ethoxylates and featuring branched and linear alkyl chains. According to embodiments, the detergent compositions include an amine oxide surfactant and a blend of at least two alcohol ethoxylate surfactants, wherein a first alcohol ethoxylate is a C8-C11 alcohol ethoxylate and a second alcohol ethoxylate is a C12-C18 alcohol ethoxylate, and wherein the ethoxylate surfactants comprise a mixture of linear and branched structures. The detergent compositions can further include water and additional functional ingredients and can be provided as concentrate or use compositions. The detergent compositions are preferably solvent-free. Exemplary detergent compositions are shown in Tables 1A-1B in weight percentages on an actives basis.

TABLE 1A

| Material | First Exemplary Range wt.-% (actives basis) | Second Exemplary Range wt.-% (actives basis) | Third Exemplary Range wt.-% (actives basis) |
|---|---|---|---|
| Amine oxide | 2-40 | 3-30 | 3-18 |
| Alcohol Ethoxylates | 10-50 | 10-40 | 20-40 |
| Water | 20-80 | 20- 70 | 30-70 |
| Additional Functional Ingredients | 0-30 | 0-25 | 0-20 |

TABLE 1B

| Material | First Exemplary Range wt.-% (actives basis) | Second Exemplary Range wt.-% (actives basis) | Third Exemplary Range wt.-% (actives basis) |
|---|---|---|---|
| Amine oxide | 2-40 | 3-30 | 3-18 |
| C8-C11 Alcohol Ethoxylate(s) | 2-10 | 2-8 | 5-8 |
| C12-C20 Alcohol Ethoxylate(s) | 8-40 | 8-32 | 10-30 |
| Water | 20-80 | 20-70 | 30-70 |
| Additional Functional Ingredients | 0-30 | 0-25 | 0-20 |

The detergent compositions are neutral or near-neutral pH compositions. In an embodiment, the pH is about 7. In further embodiments, the pH is about 6 to about 8, or about 6.5 to about 7.5.

Amine Oxides

The detergent compositions comprise one or more amine oxides. Amine oxides are tertiary amine oxides having the general formula:

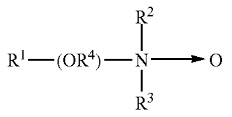

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Exemplary semi-polar amine oxides include for example dimethyl amine oxides, such as lauryl dimethyl amine oxide, myristyl dimethyl amine oxide, cetyl dimethyl amine oxide, combinations thereof, and the like. An exemplary amine oxide is available from Lonza under the tradename Barlox 12.

Useful water-soluble amine oxide surfactants are selected from the octyl, decyl, dodecyl, isododecyl, coconut, or tallow alkyl di-(lower alkyl) amine oxides. Most water soluble amine oxide surfactants are selected from the coconut or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

In some embodiments, the amine oxide(s) is included in the detergent composition at an amount on an actives basis of at least about 2 wt-% to about 40 wt-%, about 3 wt-% to about 30 wt-%, about 3 wt-% to about 18 wt-%, about 3 wt-% to about 15 wt-%, about 3 wt-% to about 12 wt-%, or about 6 wt-% to about 12 wt-%. In addition, without being limited according to the invention, all ranges recited are inclusive of the numbers defining the range and include each integer within the defined range.

Alcohol Ethoxylates

The detergent compositions include a blend of at least two alcohol ethoxylate surfactants, containing both short and long chain alcohol ethoxylates and featuring branched and linear alkyl chains. Beneficially, the alcohol ethoxylates provide enhanced cleanability of the various soiled surfaces, as a result of the combination of the shorter chain alcohol ethoxylates providing enhanced penetration of soils and the longer chain alcohol ethoxylates providing enhanced emulsification of the soils. The compositions beneficially include a synergistic combination of alcohol ethoxylates, wherein a combination of both linear and branched compounds having a carbon chain between about 4 and about 20 carbons are employed, and wherein the chain length of at least two of the alcohol ethoxylates vary, preferably having at least one short chain and at least one long chain alcohol ethoxylate.

Suitable alcohol ethoxylates have between about 1 and about 40 moles of ethylene oxide and carbon chains between about 8 and about 20 carbons in length.

In a preferred embodiment, a first alcohol ethoxylate is a C8-C11 alcohol ethoxylate (i.e. short chain) with about 4 to about 20 moles of ethylene oxide, and a second alcohol ethoxylate is a C12-C20 alcohol ethoxylate (i.e. long chain) with about 6 to about 20 moles of ethylene oxide, and wherein the alcohol ethoxylates are either branched or linear. In some embodiments, more than one short and/or long chain alcohol ethoxylate is employed. In some embodiments, one short chain and two long chain alcohol ethoxylates are employed, wherein one of the long chain alcohol ethoxylates is linear and one of the long chain alcohol ethoxylates is branched. In a still further embodiment, the short chain alcohol ethoxylate is linear and/or branched, or partially linear and partially branched.

In a further preferred embodiment, a first alcohol ethoxylate is a C9-C11 alcohol ethoxylate with about 4 to about 15 moles of ethylene oxide, and a second alcohol ethoxylate is a C12-C18 alcohol ethoxylate with about 6 to about 12 moles of ethylene oxide, and wherein one of the alcohol ethoxylates is branched and another is linear. In these embodiments, more than one short chain and/or long chain alcohol ethoxylate can be employed. In some embodiments, one short chain and two long chain alcohol ethoxylates are employed, wherein one of the long chain alcohol ethoxylates is linear and one of the long chain alcohol ethoxylates is branched. In a still further embodiment, the short chain alcohol ethoxylate is linear and/or branched, or partially linear and partially branched.

In a still further preferred embodiment, a first alcohol ethoxylate is a C9-C11 alcohol ethoxylate with about 4 to about 15 moles of ethylene oxide, and a second alcohol ethoxylate is a C12-C16 alcohol ethoxylate with about 6 to about 12 moles of ethylene oxide, and wherein one of the alcohol ethoxylates is branched and another is linear. In these embodiments, more than one short chain and/or long chain alcohol ethoxylate can be employed. In some embodiments, one short chain and two long chain alcohol ethoxylates are employed, wherein one of the long chain alcohol ethoxylates is linear and one of the long chain alcohol ethoxylates is branched. In a still further embodiment, the short chain alcohol ethoxylate is linear and/or branched, or partially linear and partially branched.

Exemplary alcohol ethoxylates are commercially available under the tradename Tomakleen (Evonik), such as Tomakleen G12 (C9-C11 alcohol ethoxylate), Berol (Nouryon), such as Berol 266 (C9-C11 alcohol ethoxylate, 5EO), Surfonic (Huntsman), such as Surfonic TDA-9 or Lutensol (BASF), such as Lutensol TDA9 (isotridecyl alcohol ethoxylate, 9EO) and Tomadol (Evonik), such as Tomadol 25-7 (C12-C15 alcohol ethoxylate, 7EO).

In embodiments, the alcohol alkoxylate surfactants are included in the detergent compositions from about 10 wt-% to about 50 wt-%, from about 10 wt-% to about 40 wt-%, from about 15 wt-% to about 40 wt-%, or from about 20 wt-% to about 40 wt-%. In addition, without being limited according to the invention, all ranges recited are inclusive of the numbers defining the range and include each integer within the defined range.

In embodiments, the C8-C11, preferably the C9-C11 alcohol alkoxylate surfactant(s) are included in the detergent compositions from about 2 wt-% to about 10 wt-%, from about 2 wt-% to about 8 wt-%, or from about 5 wt-% to about 8 wt-%, and the C12-C20, preferably C12-C18 alcohol alkoxylate surfactant(s) are included in the detergent compositions from about 8 wt-% to about 40 wt-%, from about 8 wt-% to about 32 wt-%, or from about 10 wt-% to about 30 wt-%. In addition, without being limited according to the invention, all ranges recited are inclusive of the numbers defining the range and include each integer within the defined range.

The treatise Nonionic Surfactants, edited by Schick, M. J., Vol. 1 of the Surfactant Science Series, Marcel Dekker, Inc., New York, 1983 provides further description of nonionic compounds. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch). Each of these references is herein incorporated by reference in their entirety.

Solvent-Free Detergent Compositions

In preferred embodiments, the detergent compositions are solvent-free. Conventional detergents can include organic and/or inorganic solvents. Exemplary solvents include alcohols (e.g. ethanol, isopropanol, benzyl alcohol, etc.), glycol ethers, polydimethylsiloxanes (e.g. dimethicone), terpene compounds, oils, benzenes, and the like. Without being limited to benefits and/or applications of the detergent compositions, it is beneficial the detergent compositions are solvent-free as such solvents are highly regulated as they are classified as volatile organic compounds (VOC).

The detergent compositions are provided in a water-based formulation. In embodiment, the water is included in the detergent compositions from about 20 wt-% to about 80 wt-%, from about 30 wt-% to about 80 wt-%, from about 20 wt-% to about 70 wt-%, or from about 30 wt-% to about 70 wt-%. In addition, without being limited according to the invention, all ranges recited are inclusive of the numbers defining the range and include each integer within the defined range.

Additional Functional Ingredients in Detergent Compositions

The components of the detergent compositions can further be combined with various functional components suitable for uses disclosed herein. In some embodiments, the detergent compositions including the amine oxide surfactant and combination of at least two alcohol ethoxylate surfactants make up a large amount, or even substantially all of the total weight of the detergent compositions. For example, in some embodiments few or no additional functional ingredients are disposed therein. In other embodiments, additional functional ingredients may be included in the detergent compositions. In preferred embodiments, the detergent compositions do not include a solvent.

The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning. However, other embodiments may include functional ingredients for use in other applications.

According to embodiments, the various additional functional ingredients may be provided in a detergent composition in the amount from about 0 wt-% and about 30 wt-%, from about 0 wt-% and about 25 wt-%, from about 0 wt-% and about 20 wt-%, from about 0.01 wt-% and about 20 wt-%, from about 0.1 wt-% and about 10 wt-%, from about 1 wt-% and about 10 wt-%, or from about 1 wt-% and about 5 wt-%. In addition, without being limited according to the invention, all ranges recited are inclusive of the numbers defining the range and include each integer within the defined range.

Embodiments of Detergent Composition

In some embodiments a detergent composition comprises: an amine oxide surfactant; and at least two alcohol ethoxylate surfactants, wherein a first alcohol ethoxylate is a C8-C11 alcohol ethoxylate and a second alcohol ethoxylate is a C12-C20 alcohol ethoxylate, and wherein the ethoxylate surfactants comprise a mixture of linear and branched structures, wherein the pH of the detergent composition is from about 6 to about 8. In any one embodiment, the amine oxide is a dimethyl amine oxide, or an octyl, decyl, dodecyl, isododecyl, coconut, or tallow alkyl di-(lower alkyl) amine oxide. In any one embodiment, the dimethyl amine oxide is a lauryl dimethyl amine oxide, myristyl dimethyl amine oxide, or cetyl dimethyl amine oxide. In any one embodiment, the first alcohol ethoxylate is linear and/or branched and has between about 4 and about 20 moles of ethylene oxide.

In any one embodiment, the first alcohol ethoxylate is a C9-C11 linear and/or branched alcohol ethoxylate and has between about 4 and about 15 moles of ethylene oxide. In any one embodiment, the second alcohol ethoxylate is linear and/or branched and has between about 6 and about 20 moles of ethylene oxide.

In any one embodiment, the second alcohol ethoxylate is a C12-C16 linear and/or branched and has between about 6 and about 12 moles of ethylene oxide.

In further exemplary embodiments, the detergent composition comprises one C8-C11 alcohol ethoxylate and two C12-C20 alcohol ethoxylates, wherein one of the C12-C20 alcohol ethoxylates is linear and one of the C12-C20 alcohol ethoxylates is branched. In any one embodiment, the C8-C11 alcohol ethoxylate is partially linear and partially branched. In any one embodiment, the amine oxide comprises from about 3 wt-% to about 30 wt-% (on an actives basis) of the composition, the C8-C11 alcohol ethoxylate comprises from about 2 wt-% to about 10 wt-% of the composition, and the C12-C20 alcohol ethoxylate comprises from about 8 wt-% to about 40 wt-% of the composition.

In still further exemplary embodiments, the amine oxide of any embodiment of the detergent composition comprises from about 3 wt-% to about 18 wt-% of the composition (on an actives basis) and the alcohol ethoxylates comprises from about 10 wt-% to about 50 wt-% of the composition. In any one embodiment, the composition can be solvent free. Still further in any embodiment of the detergent composition, the composition can further comprise an additional functional ingredient in an amount from about 0.01 wt-% to about 20 wt-% and/or water in the amount from about 20 wt-% to about 80 wt-%.

Builder Compositions

According to embodiments, various builder compositions can be combined with the detergent composition to provide a cleaning system. Exemplary builders suitable for applications of uses described herein can include the exemplary ranges described in Table 2 in weight percentages on an actives basis. In embodiments described herein the water in the builder compositions can be water of addition and/or water included from addition of the raw materials, including for example alkalinity source(s), chelant(s) and/or additional functional ingredients.

It is a particular benefit that the builder composition provides an alkalinity source that is formulated separately from the surfactants in the detergent composition. This provides a benefit to be able to adjust the amount of alkalinity required for a particular soil and/or application of use without changing the amount of surfactants in the cleaning system, which can provide for example a significant cost savings.

TABLE 2

| Material | First Exemplary Range wt.-% (actives basis) | Second Exemplary Range wt.-% (actives basis) | Third Exemplary Range wt.-% (actives basis) |
|---|---|---|---|
| Alkalinity Source(s) | 10-80 | 15-70 | 20-60 |
| Chelant(s) | 2-30 | 4-30 | 6-20 |
| Water | 10-80 | 10-75 | 10-70 |
| Additional Functional Ingredients | 0-90 | 0-75 | 1-50 |

Alkalinity Sources

The builder compositions include at least one alkalinity source. Suitable alkalinity sources include, but are not limited to, inorganic and/or organic alkalinity sources. Exemplary inorganic alkalinity sources include, but are not limited to, alkali metal hydroxides, alkali metal carbonates (e.g., sodium carbonate, potassium carbonate, sodium bicarbonate, potassium bicarbonate, sodium sesquicarbonate, potassium sesquicarbonate, and the like, or combinations thereof), alkali metal borates (e.g., sodium borate, potassium borate, and the like, or combinations thereof), alkali metal oxides (e.g., sodium oxide, potassium oxide, and the like, or combinations thereof), and the like, or combinations thereof. Exemplary organic alkalinity sources include, but are not limited to, amines and strong nitrogen bases including, for example monoethanolamine, monopropanolamine, diethanolamine, dipropanolamine, triethanolamine, tripropanolamine, mixed isopropanolamines, and the like, or combinations thereof.

In embodiment, the alkalinity source(s) is included in the builder compositions from about 10 wt-% to about 80 wt-%, from about 15 wt-% to about 70 wt-%, from about 20 wt-% to about 60 wt-%, or from about 20 wt-% to about 50 wt-%, all weight percentages on an actives basis. In further embodiment, the alkalinity source(s) is included in the builder compositions from about 10 wt-% to about 80 wt-%, from about 10 wt-% to about 70 wt-%, from about 10 wt-% to about 60 wt-%, from about 10 wt-% to about 50 wt-%, or from about 10 wt-% to about 40 wt-%, all weight percentages on an actives basis. In addition, without being limited according to the invention, all ranges recited are inclusive of the numbers defining the range and include each integer within the defined range.

Chelants

The builder compositions include at least one chelant. Various types of chelants can be included in the builder composition, including polycarboxylic acid polymer chelants, aminocarboxylates (or aminocarboxylic acid) chelants, phosphonate chelants and/or phosphonic acid chelants, and the like.

Polycarboxylic acid polymer chelants are non-phosphorus containing chelants. Polycarboxylates include those chelant polymers having pendant carboxylate (—CO2-) groups such as polyacrylic acid homopolymers, polymaleic acid homopolymers, maleic/olefin copolymers, sulfonated copolymers or terpolymers, acrylic/maleic copolymers or terpolymers polymethacrylic acid homopolymers, polymethacrylic acid copolymers or terpolymers, acrylic acid-methacrylic acid copolymers, hydrolyzed polyacrylamides, hydrolyzed polymethacrylamides, hydrolyzed polyamide-methacrylamide copolymers, hydrolyzed polyacrylonitriles, hydrolyzed polymethacrylonitriles, hydrolyzed acrylonitrile-methacrylonitrile copolymers and combinations thereof. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein. These materials may also be used at sub stoichiometric levels to function as crystal modifiers. Polycarboxylic acid polymer chelants can include, polyacrylic acid homopolymers and polymaleic acid homopolymers, and polymers modified by a fatty acid end group. Exemplary polyacrylic acid homopolymers include those with a molecular weight between about 500-100,000 g/mol, or between about 1,000-50,000 g/mol, or between about 1,000-25,000 g/mol. Exemplary suitable commercially available polyacrylic acid polymers include Acusol 445N (a fully neutralized homopolymer of acrylic acid), Acusol 448 (polyacrylic:polymaleic copolymer) and Acusol 944 (acrylic acid homopolymer) available from Dow Chemical.

Aminocarboxylate chelants include, for example, N-hydroxyethylaminodiacetic acid, ethylenediaminetetraacetic acid (EDTA), methylglycinediacetic acid (MGDA), hydroxyethylenediaminetetraacetic acid, diethylenetriaminepentaacetic acid, N-hydroxyethyl-ethylenediaminetriacetic acid (HEDTA), glutamic acid N,N-diacetic acid (GLDA), diethylenetriaminepentaacetic acid (DTPA), Iminodisuccinic acid (IDS), ethylenediamine disuccinic acid (EDDS), 3-hydroxy-2,2-iminodisuccinic acid (HIDS), hydroxyethyliminodiacetic acid (HEIDA) and other similar acids having an amino group with a carboxylic acid substituent.

Phosphonate chelants include, for example phosphinosuccinic acid oligomer (PSO) described in U.S. Pat. Nos. 8,871,699 and 9,255,242; 2-phosphinobutane-1,2,4-tricarboxylic acid (PBTC), 1-hydroxyethane-1,1-diphosphonic acid (HEDP), $CH_2C(OH)[PO(OH)_2]_2$; aminotri(methylenephosphonic acid), $N[CH_2PO(OH)_2]_3$; aminotri(methylenephosphonate), sodium salt (ATMP), $N[CH_2PO(ONa)_2]_3$; 2-hydroxyethyliminobis(methylenephosphonic acid), $HOCH_2CH_2N[CH_2PO(OH)_2]_2$; diethylenetriaminepenta(methylenephosphonic acid), $(HO)_2POCH_2N[CH_2CH_2N[CH_2PO(OH)_2]_2]_2$; diethylenetriaminepenta(methylenephosphonate), sodium salt (DTPMP), $C_9H_{(28-x)}N_3Na_xO_{15}P_5$ (x=7); hexamethylenediamine(tetramethylenephosphonate), potassium salt, $C_{10}H_{(28-x)}N_2K_xO_{12}P_4$ (x=6); bis(hexamethylene)triamine(pentamethylenephosphonic acid), $(HO_2)POCH_2N[(CH_2)_2N[CH_2PO(OH)_2]_2]_2$; monoethanolamine phosphonate (MEAP); diglycolamine phosphonate (DGAP) and phosphorus acid, $H_3PO_3$. Preferred phosphonates are PBTC, HEDP, ATMP and DTPMP. A neutralized or alkali phosphonate, or a combination of the phosphonate with an alkali source prior to being added into a builder composition can also be employed.

In an embodiment, the chelant(s) are included in the builder compositions from about 2 wt-% to about 30 wt-%, from about 4 wt-% to about 30 wt-%, or from about 6 wt-% to about 20 wt-%, all weight percentages on an actives basis. In a further embodiment, the chelant(s) are included in the builder compositions from about 4 wt-% to about 30 wt-%, from about 6 wt-% to about 20 wt-%, from about 8 wt-% to about 20 wt-%, from about 5 wt-% to about 20 wt-%, or from about 6 wt-% to about 15 wt-%, all weight percentages on an actives basis. In addition, without being limited according to the invention, all ranges recited are inclusive of the numbers defining the range and include each integer within the defined range.

Additional Functional Ingredients in Builder Compositions

The components of the builder compositions can further be combined with various functional components suitable for uses disclosed herein. In some embodiments, the builder compositions including the alkalinity source and at least one chelant make up a large amount, or even substantially all of the total weight of the compositions. For example, in some embodiments few or no additional functional ingredients are disposed therein. In other embodiments, additional functional ingredients may be included in the compositions.

The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning. However, other embodiments may include functional ingredients for use in other applications.

In some embodiments, the builder compositions can include the additional functional ingredients, such as for example, additional surfactants, oxidizing agents, optical brighteners, defoaming agents, anti-redeposition agents, bleaching agents, solubility modifiers, dispersants, metal protecting agents, soil antiredeposition agents, stabilizing agents, corrosion inhibitors, builders/sequestrants/chelating agents, enzymes, aesthetic enhancing agents including fragrances and/or dyes, additional rheology and/or solubility modifiers or thickeners, hydrotropes or couplers, buffers, solvents, additional cleaning agents and the like.

These additional ingredients can be pre-formulated with the builder compositions or added to the use solution before, after, or substantially simultaneously with the addition of the compositions.

According to embodiments, the various additional functional ingredients may be provided in a builder composition in the amount from about 0 wt-% and about 90 wt-%, from about 0 wt-% and about 75 wt-%, from about 0 wt-% and about 50 wt-%, from about 0.01 wt-% and about 50 wt-%, from about 0.1 wt-% and about 50 wt-%, from about 1 wt-% and about 50 wt-%, from about 1 wt-% and about 30 wt-%, from about 1 wt-% and about 25 wt-%, or from about 1 wt-% and about 20 wt-%. In addition, without being limited according to the invention, all ranges recited are inclusive of the numbers defining the range and include each integer within the defined range.

Booster Compositions

In some embodiments a booster composition can be included in a cleaning system employing the detergent composition. In embodiments, acidic cleaners, oxidants and/or sanitizers could be employed. In one embodiment, a preferred booster includes acids such as alkanoic acids (e.g. formic acid, acetic acid, propanoic acid, oxalic acid, etc.), hydroxy carboxylic acids (e.g. citric acid, gluconic acid, etc.), sulfuric acid, phosphoric acid, nitric acid, hydrochloric acid, sulfamic acid, methane sulfonic acid, or combinations thereof. In another embodiment, the preferred booster includes oxidants such as peroxycarboxylic acids and/or peroxygen bleach-containing compositions. In another embodiment, the preferred booster includes hydrogen peroxide, sanitizing quats (e.g. benzylammonium chloride, dimethylalkylammonium chloride, or similar) or other sanitizing ingredients. In another embodiment, the preferred booster includes a combination of above-mentioned acids, oxidants, and/or sanitizing ingredients.

Methods of Cleaning

The methods of cleaning are particularly well suited for removing cosmetic soils. Without being limited to a theory or mechanism of action, it is believed that the hydrophobic portion of the various cosmetic soils make the soils particularly difficult to remove from surfaces. For example, hydrophobic portions of cosmetic soils (e.g. lipsticks) can be in the form of an oil, a viscous solid, or a wax, depending on the desired consistency of the cosmetic product. For example, a lip gloss that is rolled onto the lips will tend to be more liquid in consistency than a lip gloss that is applied using a fingertip. Naturally, one would expect the roll-on lip gloss to have a higher oil content than a fingertip lip gloss, which would have more solids or waxes. Such hydrophobic components of cosmetic soils may be natural and/or synthetic, including for example, waxes, canola oil, cetyl alcohol, cetyl esters, cocoa (*Theobroma cacao*) butter, coconut (*Cocos nucifera*) oil, hydrolyzed beeswax, lanolin oil, lanolin wax, mineral oil, paraffin, PEG beeswax, petrolatum, petroleum jelly, shea butter, and many others. Additional materials found in lip cosmetics include, for example, silicones, such as dimethicone, along with other pigments, dyes, colorants, and fragrances. Cosmetics products may also contain various forms of sunscreen agents, for example titanium oxide and zinc oxide, both of them frequently leaving undesirable white films behind after soil removal.

It is understood that the detergent compositions and cleaning systems disclosed herein are capable of removing such exemplary cosmetic soils having the hydrophobic and other materials described above as well as those not included in the list above.

The methods of cleaning include contacting a surface in need of removing a cosmetic soil. In an aspect, the surface is a hard surface that is soiled with a waxy, oily and/or greasy cosmetic soil. Any means of contacting can be used to place the surface in contact with the detergent composition and/or cleaning system, including for example, soaking, spraying, dripping, wiping, or the like. Included within the scope of contacting described herein, the surface can also be soaked, including a pretreatment, with the detergent composition and/or cleaning system (or individual portions thereof). As a result of the contacting step the surface is cleaned, and the soils removed.

In certain embodiments a concentrate can be sprayed onto a surface for a hard surface treatment. The contacting time may vary from a few seconds to a few minutes. In other embodiments, a lower concentration of the detergent compositions and/or cleaning systems may be employed for a presoak application, such as where a surface is soaked before further cleaning (e.g. mechanical action and/or force applied in a cleaning application). In such embodiments the contact time can vary from a few minutes to a few hours (e.g. overnight soak).

In an aspect, the surface is a hard surface. In a further aspect, the surface is a hard surface having one or more cosmetic soils. Exemplary surfaces include cosmetic manufacturing equipment. One skilled in the art will ascertain that such surfaces can be metal (e.g. stainless steel), concrete, glass, ceramic, and/or plastic surfaces.

The cleaning steps described herein can constitute part of a manual wash process. In an alternative aspect, the ware is washed in an automated fashion and/or involving mechanical force or action applied in combination or after the detergent composition and/or cleaning system is contacted to the surface. An example of mechanical action and/or force can include, for example, application using spray nozzles, movement within a mixing tank, or manual and/or mechanical scrubbing. In some embodiments agitation is employed to assist in removing the soils. However, in other applications no agitation, whether mechanical action or otherwise is required to remove the soils providing a significant benefit over state-of-the-art cleaning methods.

In washing applications, soaking (or pretreatment) applications and/or other hard surface treatment applications, the detergent composition can be applied to the surface alone, or in combination with the builder composition and/or additional booster compositions (i.e. cleaning systems). In some embodiments, the detergent composition or cleaning systems can be employed in a soaking application alone, such that no mechanical action and/or force is required to remove the soils. Instead, soaking with the aqueous wash solution followed by rinsing is adequate to remove soils according to the methods described herein.

The detergent composition and/or cleaning systems can be applied in a concentrate and/or use solution. In embodiments, where a concentrate composition is applied, a first step of diluting and/or creating an aqueous use solution can also be included in the methods. An exemplary dilution step includes contacting the liquid composition with water.

The detergent composition and/or cleaning systems employing the detergent composition can be provided at an actives level in a ready to use and/or concentrate composition providing a desired amount of actives of the components of the compositions, namely the surfactants of the detergent composition. In an aspect, a suitable concentration of the detergent composition is applied to a surface at a concentration from about 0.5% to about 8% in a use solution, or from about 1% to about 6% in a use solution.

The cleaning systems employing the detergent composition in combination with the builder composition (and/or optionally a booster composition) can be provided at various ratios of the builder composition to detergent composition depending upon the soil conditions. In some embodiments, the ratio of the builder composition to the detergent composition in the cleaning system is greater than 1:1, or greater than 2:1. In some embodiments, the ratio of the builder composition to the detergent composition in the cleaning system is from about 1:1 to about 5:1, about 1:1 or greater, about 2:1 or greater, about 3:1 or greater, or about 4:1 or greater. In other embodiments, the ratio of the builder composition to the detergent composition in the cleaning system is from about 1:1 to about 1:5 or greater, or about 1:1 to about 1:2.

In an aspect, the detergent composition is applied to a surface. In a further aspect, the detergent composition is applied in combination with (at the same time, before or after) the builder composition and/or optional boosters. In embodiments where only the detergent composition is applied to a surface in need of cleaning, a use solution will have a pH of between about 6 to about 8, or about 6.5 to about 7.5, or about 7. In embodiments where the detergent composition is applied to a surface in need of cleaning in combination together with a builder composition, a use solution will have an alkaline pH of greater than 7, or at least about 8, or even greater (up to pH 14).

In an aspect, the detergent composition and/or cleaning system contacts the surface for a sufficient amount of time to remove the soils, including from a few seconds to a few hours, including all ranges therebetween. In an embodiment, the detergent composition and/or cleaning system contacts the surface for at least about 15 seconds, at least about 30 seconds, at least about 45 seconds, or at least about 60 seconds. In additional embodiments, the detergent composition and/or cleaning system contacts the surface for at least about 1 minute, at least about 2 minutes, at least about 3 minutes, at least about 4 minutes, or at least about 5 minutes. In still other embodiments the detergent composition and/or cleaning system contacts the surface for at least about 15 minutes, at least about 30 minutes, at least about 60 minutes, at least about 2 hours, or longer.

In an aspect, the detergent composition and/or the cleaning system contacts the surface that is at an ambient temperature to a heated temperature of about 100° C., including any ranges therebetween. In an additional aspect, the detergent composition and/or the cleaning system may be heated (e.g. up to about 100° C., about 50-100° C., about 50-80° C., or about 50-70° C., including any ranges therebetween) before it contacts the surface. Alternatively, the detergent composition and/or the cleaning system may be applied to the surface at an ambient temperature. In another aspect, the soiled surface is at ambient temperature and the cleaning compositions consisting of detergent and builder component are preheated to a temperature up to 80-90° C.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The detergent composition and builder composition shown in Tables 3 and 4, respectively, were evaluated in the following Examples. The water content of the compositions includes water from the raw materials (such as amine oxide in Table 3 and alkalinity and chelants in Table 4).

TABLE 3

| Detergent composition | |
|---|---|
| Material | wt.-% (actives basis) |
| Amine oxide | 10-20 |
| C9-C11 Alcohol Ethoxylate, partially linear, partially branched | 2-6 |
| C12-C15 Alcohol Ethoxylate, branched | 5-10 |
| C12-C15 Alcohol Ethoxylate, linear | 10-15 |
| Water | 40-70 |

TABLE 4

| Builder composition | |
|---|---|
| Material | wt.-% (actives basis) |
| Alkalinity Source - sodium hydroxide | 20-30 |
| Chelant(s) - HEDP, Acusol 448 (polyacrylic:polymaleic copolymer), EDTA | 5-10 |
| Water | 60-75% |

Example 1

A weight-based, air dried, thick soil coupon cleaning method was conducted to assess soil removal efficacy of the detergent compositions and cleaning systems described herein against mascara soils on stainless steel coupons (SS318, 2×3 inch coupons, vertical grain). The soil—a L'Oréal Big Noire mascara—was spread evenly on a coupon with a foam brush. The coupon was dried overnight at room temperature. The soiled coupons were weighed on an analytical balance the following day and the data recorded. The soiled coupon was them placed in an agitated beaker for cleaning using the various combinations of the detergent composition and/or builder composition as shown in FIG. 1.

A 400 mL beaker contained 300 mL of cleaning solutions (total dosage of 3%, builder-to-detergent ratios as shown in FIG. 1) heated to 160 F and stirred at 200 rpm. The beakers were aligned on the stir plates to ensure the stir bar did not contact the soiled coupon. The soiled surface faced the stir bar and was soaked under agitation for 15 minutes. 2-4 replicates of each test were analyzed. At the end of the 15 minutes, the coupons were taken out and rinsed under a light stream of DI water (for 20 seconds each). The coupons were held at a 45-degree angle, 1 inch away from the water stream. The water was run along the top of the coupon where there was no soil and the water passed over the coupon 5 times. The coupons were again weighed after cleaning and the cleaning efficiency was calculated based on the percentage of weight-based soil removed.

The results show that four of the combinations of the detergent composition and/or builder composition provided 100% soil removal from the coupons.

Example 2

Figure 2:
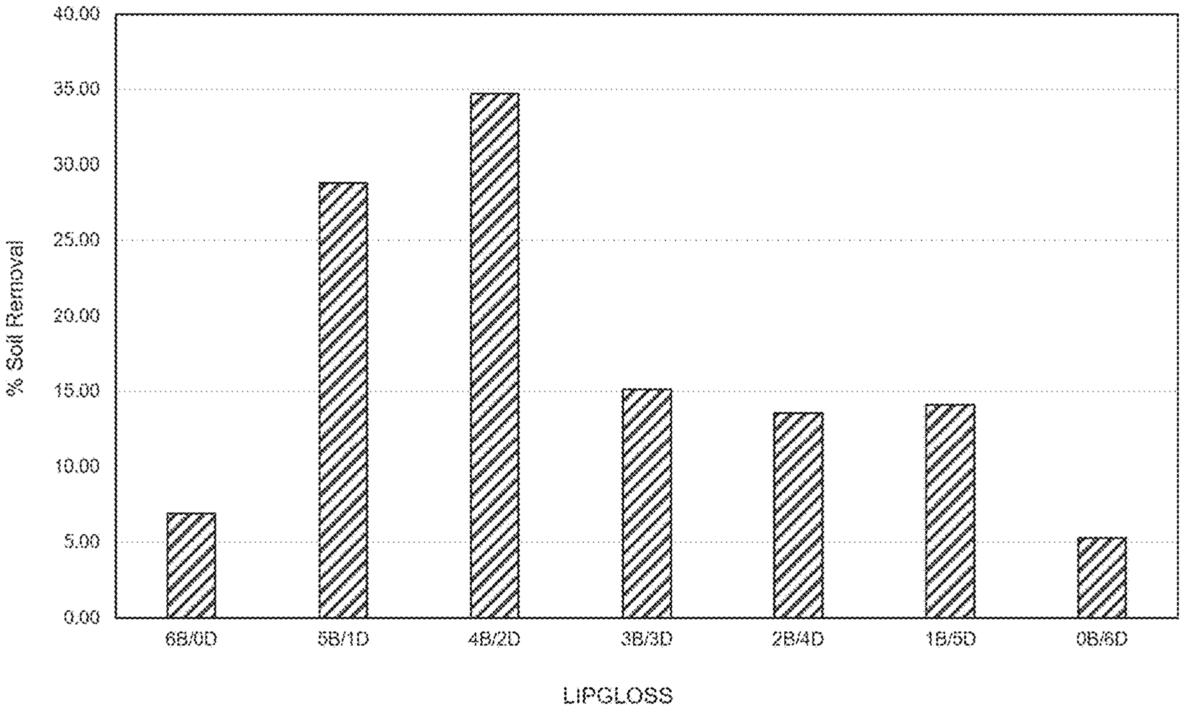
FIG. 2 depicts cleaning efficiencies (in % soil removal) for lip gloss soils at various dosage ratios of builder (B) and detergent (D) products of the cleaning system. The reported ratios, such as 4B/2D means the cleaning solution of the cleaning system contains 4% builder and 2% detergent product.

Further weight-based, air dried, thick soil coupon cleaning method was conducted to assess soil removal efficacy of the detergent compositions and cleaning systems described herein against lip gloss soils from L'Oréal Monochrome Superstay lip gloss on stainless steel coupons. The same methodology of Example 1 was repeated using 3 replicates of each test as shown in FIG. 2. In this test series, no detergent/builder ratio delivered 100% soil removal even at total dosage of 6%, indicating that lip gloss soils are more tenacious than mascara soils. However, 100% soil removal could be obtained by prolonging the cleaning time from 15 to 45 minutes. FIG. 2 does clearly show that a dosage ratio of 4% builder to 2% detergent delivered the best cleaning efficiency and that a prolonged cleaning time will result in 100% soil removal.

Example 3

Figure 3:
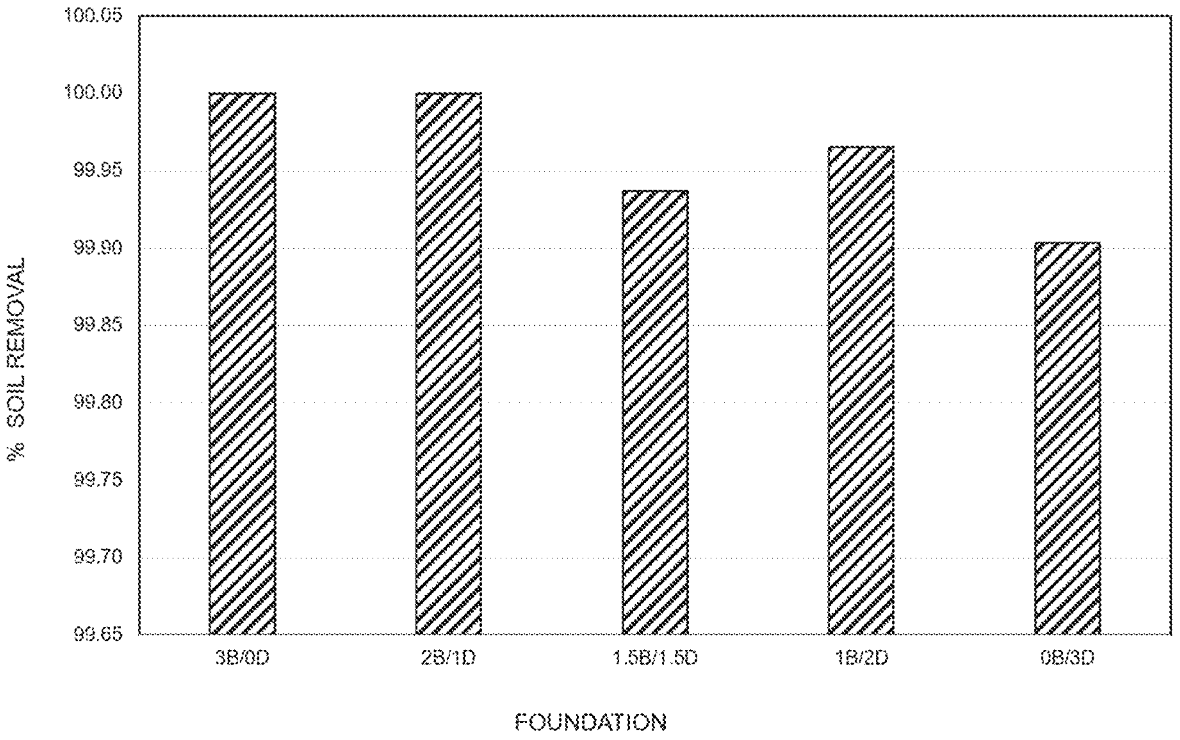
FIG. 3 depicts cleaning efficiencies (in % soil removal) for foundation soils at various dosage ratios of builder (B) and detergent (D) products of the cleaning system. The reported ratios, such as 2B/1D means the cleaning solution of the cleaning system contains 2% builder and 1% detergent product.

Further weight-based, air dried, thick soil coupon cleaning method was conducted to assess soil removal efficacy of the detergent compositions and cleaning systems described herein against foundation soils (L'Oréal Dream Matte foundation mousse) on stainless steel coupons. The same methodology of Example 1 was repeated using 3 replicates of each test as shown in FIG. 3. The use of a foundation soil is known to be less difficult to remove (in comparison to lip gloss), and as a result a lower concentration of the detergent composition containing the surfactant packages of amine oxides and alcohol ethoxylates can be utilized. This Example shows the advantage of the use of separate detergent and builder products as compared to a "one-shot" cleaning product that contains surfactants, alkalinity source, and chelants all in one formula. Since the surfactant ingredients in the detergent product are generally more expensive than the ingredients in the builder product, one can achieve cost-effective cleaning of less tenacious soils by shifting the dosage ratio towards more builder product and less detergent product as depicted in FIG. 3.

Example 4

Figure 4:
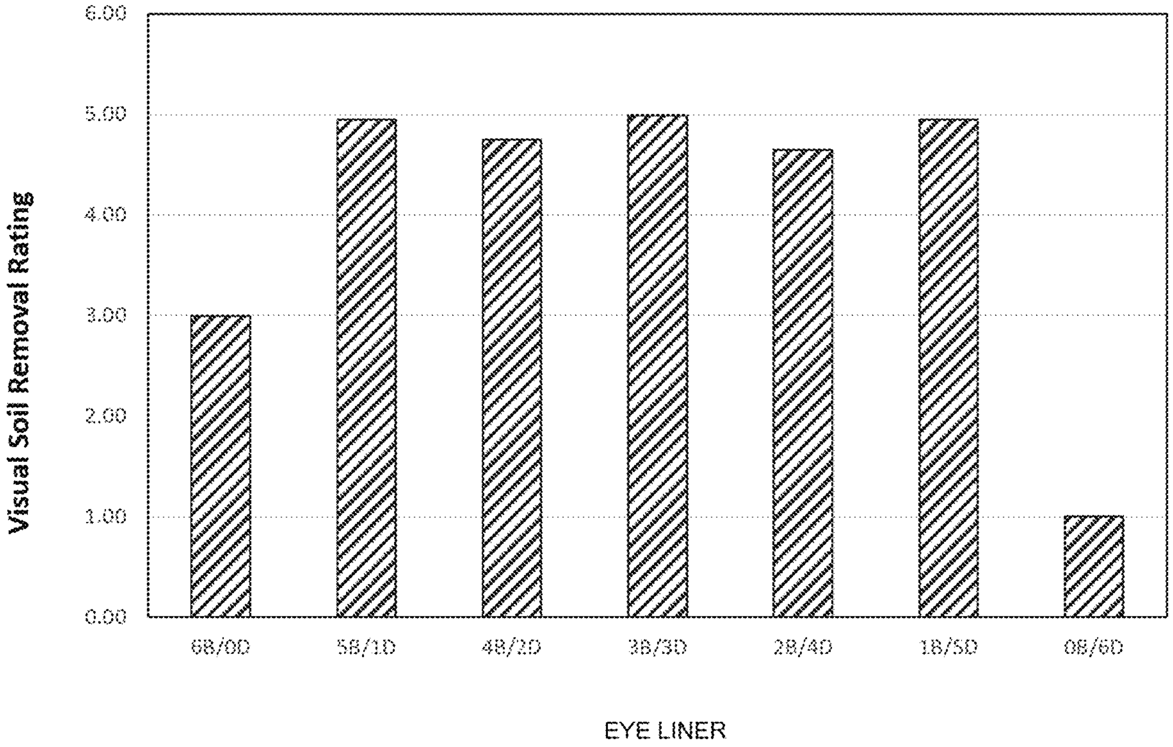
FIG. 4 depicts cleaning efficiencies using a visual rating from 0 to 5, wherein 0 equals no soil removal and 5 means complete soil removal for eye liner soils at various dosage ratios of builder (B) and detergent (D) products of the cleaning system. The reported ratios, such as 4B/2D means the cleaning solution of the cleaning system contains 4% builder and 2% detergent product.

Further weight-based, air dried, thick soil coupon cleaning method was conducted to assess soil removal efficacy of the detergent compositions and cleaning systems described herein against eyeliner soils (L'Oréal Eye Gel Eyeliner) on—stainless steel coupons. The same methodology of Example 1 was repeated using 3 replicates of each test as shown in FIG. 4. In this Example, the performance of the cleaning solutions was gauged by a visual rating from 0 for no soil removal to 5 for complete soil removal. As shown in FIG. 4, complete removal of eyeliner soils was achieved at a dosage ratio of 3% builder and 3% detergent product.

Example 5

Figure 5:
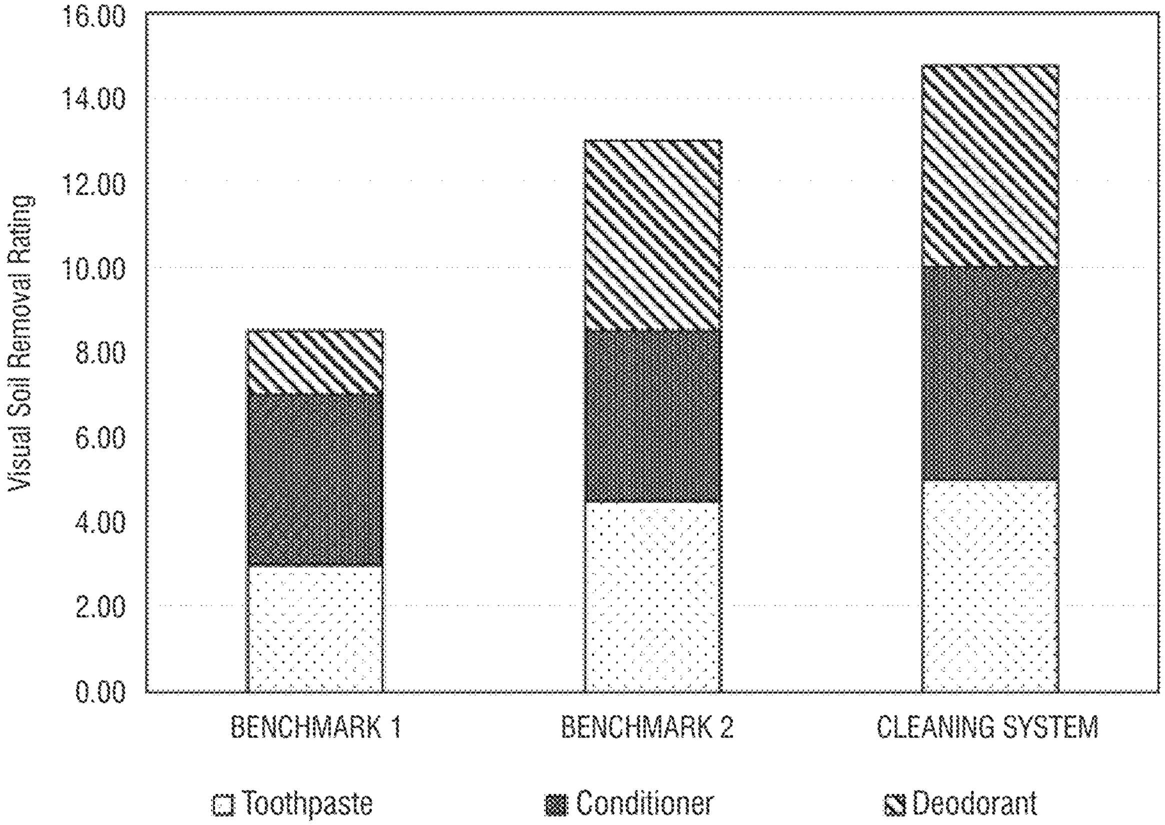
FIG. 5 depicts cumulative cleaning efficiencies using a visual rating from 0 to 5, wherein 0 equals no soil removal and 5 means complete soil removal for toothpaste, hair conditioner, and deodorant soils using equal dosages of two benchmark products as compared to the cleaning system described with a 1:1 mixture of builder (B) and detergent (D). As shown the new product removes all three soils completely leading to a cumulative score of 3×5=15.

Further weight-based, air dried, thick soil coupon cleaning method was conducted to assess soil removal efficacy of the detergent compositions and cleaning systems described herein against soils stemming from personal cleaning products such as toothpaste, hair conditioner, and deodorant on—stainless steel coupons. The same methodology of Example 1 was repeated using 3 replicates of each test as shown in FIG. 5. In this Example, the cumulative cleaning performance of builder and detergent product in a 1:1 ratio against two benchmark products at equal dosage is shown. As referred to in this Example Benchmark 1 and Benchmark 2 are commercially available built detergent formulations including surfactants, alkalinity, and chelating agents all in a single formula, which is distinct from the cleaning systems according to the description herein. The testing of the compositions was compared at equal product dosing, wherein all were provided at 6% for the benchmark products and the cumulative 6% (3% detergent composition and 3% builder composition). As in Example 4, the performance of the cleaning solutions was gauged by a visual rating from 0 for no soil removal to 5 for complete soil removal. As shown in FIG. 5, a 1:1 ratio of builder and detergent product delivered complete removal of all three soils (3×5=15).

Example 6

Figure 6:
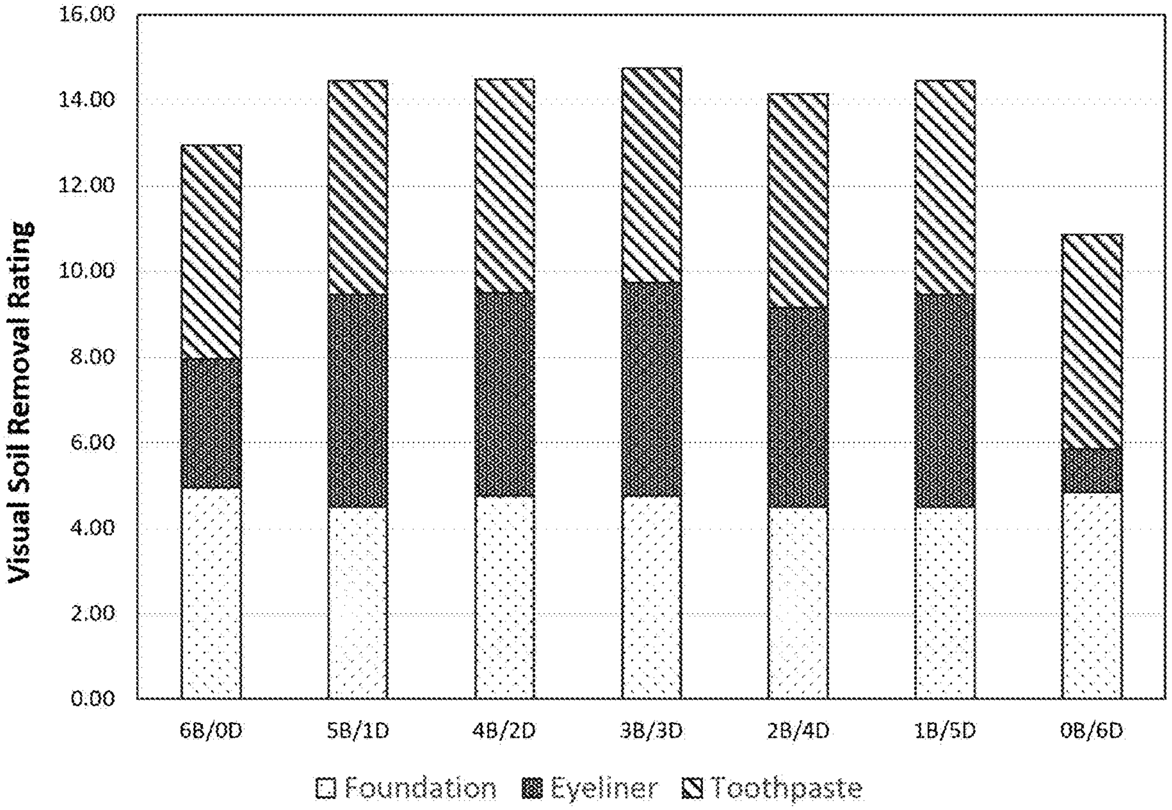
FIG. 6 depicts cumulative cleaning efficiencies using a visual rating from 0 to 5, wherein 0 equals no soil removal and 5 means complete soil removal for foundation, eye liner, and tooth paste soils at various dosage ratios of builder (B) and detergent (D) products of the cleaning system. The reported ratios, such as 4B/2D means the cleaning solution contains 4% builder and 2% detergent product. As shown the 3% B/3% D dosage ratio removes all three soils completely leading to a cumulative score of 3×5=15.
Figure 7:
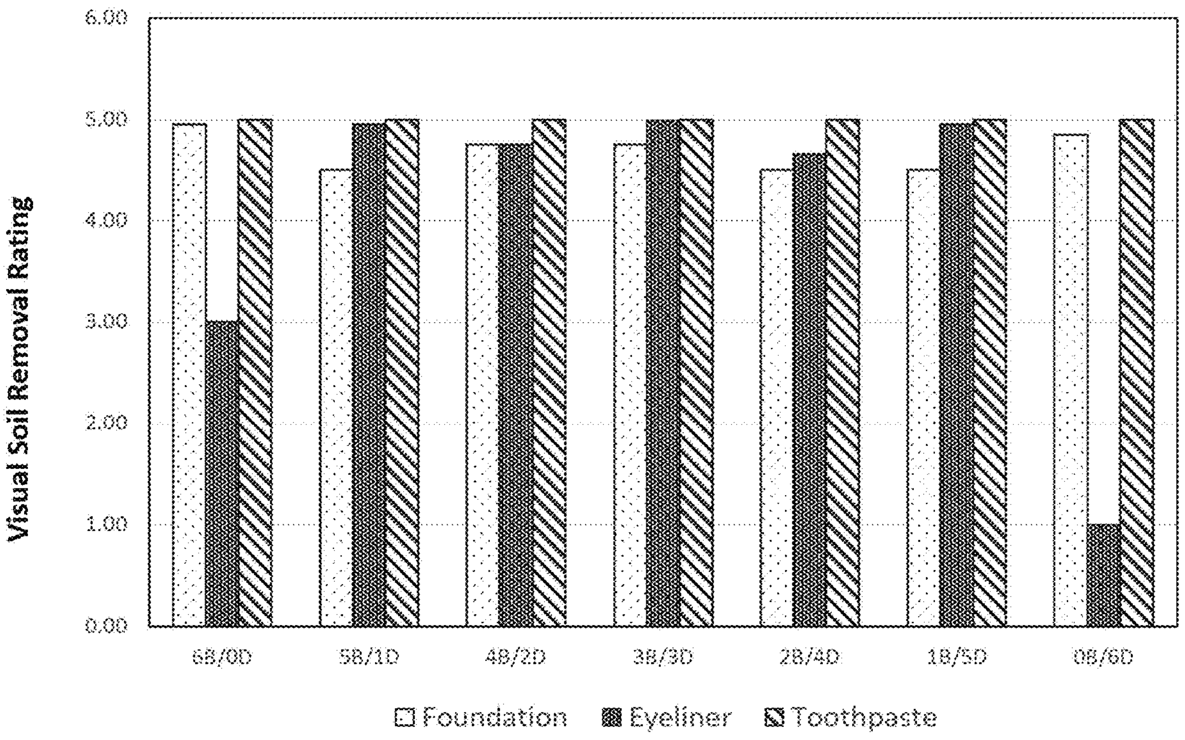
FIG. 7 depicts cleaning efficiencies using a visual rating from 0 to 5, wherein 0 equals no removal and 5 means complete soil removal for foundation, eye liner, and tooth paste soils side-by-side at various dosage ratios of builder (B) and detergent (D) products of the cleaning system. The reported ratios, such as 4B/2D means the cleaning solution contains 4% builder and 2% detergent product.

Various dosage ratios of the builder and the detergent compositions as evaluated against foundation, eyeliner and toothpaste soils are shown in FIGS. 6-7. In FIG. 6, the cumulative cleaning performance was gauged by a visual rating from 0 for no soil removal to 5 for complete soil removal of each of the three soils, resulting in a scale from 0 for no soil removal to 15 (3×5) for complete soil removal of all three soils. The results show that a dosage ratio of 3% builder and 3% detergent delivered a rating of 15, which means complete removal of all three soils. FIG. 7 shows the same three soils side-by-side to demonstrate different response of the soils to various dosage ratios of builder and detergent. Thus, in some applications a cosmetic soil that is less difficult to remove, such as toothpaste and foundation, may be removed with the builder composition alone (i.e. alkaline composition) whereas more difficult to remove soils such as the eyeliner are best treated with a cleaning system containing the combination of the detergent composition and the builder composition.

Example 7

Additional cleaning evaluations were conducted on small industrial mixing vessels used in the manufacture of cosmetics. A Symex CML 4 vessel was the equipment cleaned according to this Example using various soils. This example is a depiction of the current state of the art for cosmetic cleaning, where often multiple different types of cleaning compositions are used due to differences in the types of soils requiring distinct surfactant, chelant and/or alkalinity concentrations to effectively remove the soils. Various commercial controls were used to assess cleaning in this example as shown in Table 5.

Figure 8A:
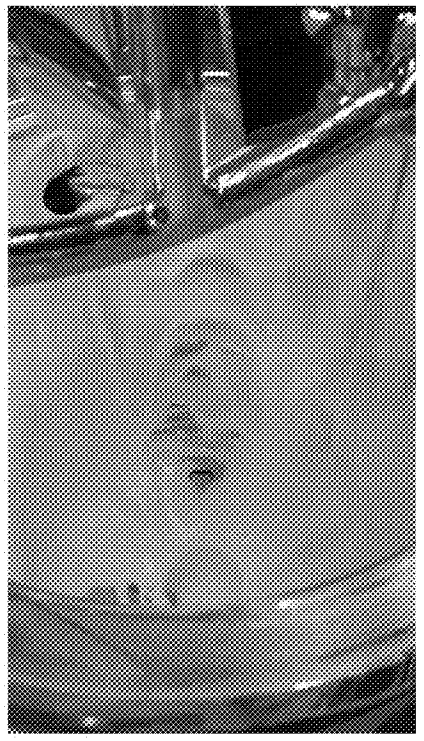
FIGS. 8A-8D show images of cleaning of vessels soiled with toothpaste (8A is before any cleaning) using various inline cleaning compositions as described in Example 7, where none of vessels shown in FIG. 8B, 8C, or 8D were fully cleaned with the commercial controls.

400 grams toothpaste soils (TOTAL® CLEAR MINT) were added to the vessel to coat the interior surfaces and the lid was closed and held at ambient temperature for 3 days (FIG. 8A). The 400 grams represents about 10% of the total capacity of the vessel and represents a 'worst case' scenario for a cleaning application in the field. The evaluated cleaning solutions were prepared and applied at a temperature of 70° C. for 15 minutes (or other indicated period of time) before determining if a 'visually clean' vessel was obtained. The entire cleaning solution was combined in a beaker and heated along with the vessel heated to the desired temperature. In the testing the solution was added manually to the vessel and then the homogenizer was started to circulate the solution.

Although not all cleaning is required to take place at an elevated temperature, in some markets this is a cleaning condition. In some examples, in the event a 'visually clean' vessel was not obtained an additional in-line product was applied. This is reflective of the current state of the art cleaning of cosmetic soils, where cleaning compositions are added to an initial (or multiple) cleaning composition in the event the surface is not clean. In various instances both a combination of multiple products at high concentration levels and long cleaning times (15-30 minutes) were required to clean the toothpaste from the vessel, resulting in a high consumption of cleaning materials and a high-cost approach to cleaning. The following is a summary of the evaluated compositions described in FIGS. 8B-8D.

TABLE 5

| Commercial Cleaning Products | |
|---|---|
| Commercial Product A | Alkaline detergent including surfactants, water conditioners, chelating agents, and dispersion agents for CIP |
| Commercial Product B | Oxidizing cleaning additive for alkaline and acid CIP detergents to remove complex soils |
| Commercial Product C (Componenta FG) | Silicone additive for foaming in CIP with high surfactants concentration |
| Commercial Product D | Acid detergent used in pharmaceutical and cosmetic industries |

Figure 8B:
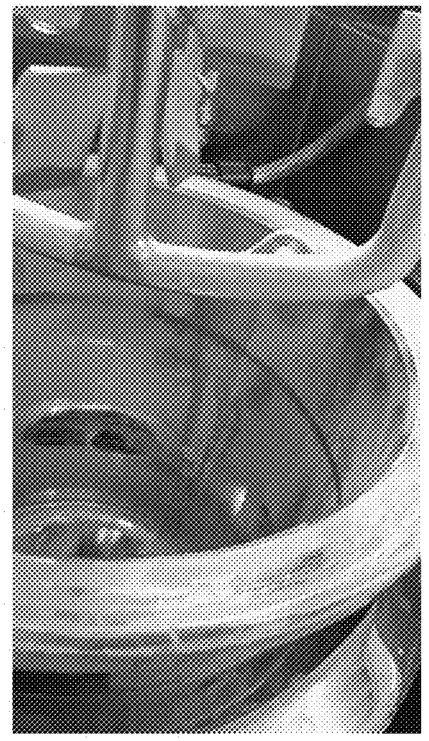
Figure 8C:
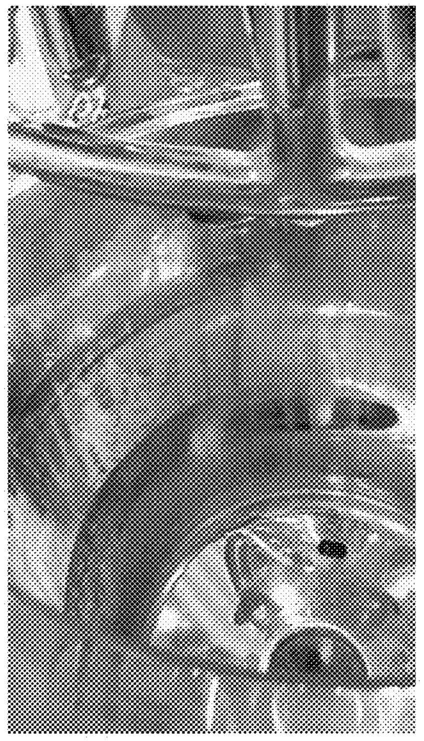
Figure 8D:

The results are shown in FIGS. 8B-8D, where none of the cleaning conditions provided a complete removal of the soil and/or films left from the toothpaste soil. This is surprising as toothpaste soils are not the most difficult to remove.

Example 8

Further testing of the cleaning systems were made in comparison to an additional commercial formulation (Commercial Product E, an alkaline detergent for removing pigmented soils and mineral containing premixes in the cosmetic industry). The cleaning system including the detergent composition and builder composition shown in Tables 3 and 4, respectively, were evaluated against a very hard to remove lipstick soil, i.e. L'Oréal Rouge Signature Stylo. The cleaning system used a 2% Detergent and 1% Builder in combination to assess whether complete soil removal could be obtained within 10 minutes, as described according to the same procedures used for the toothpaste soils in Example 7.

Figures 9A, 9B, 9C:
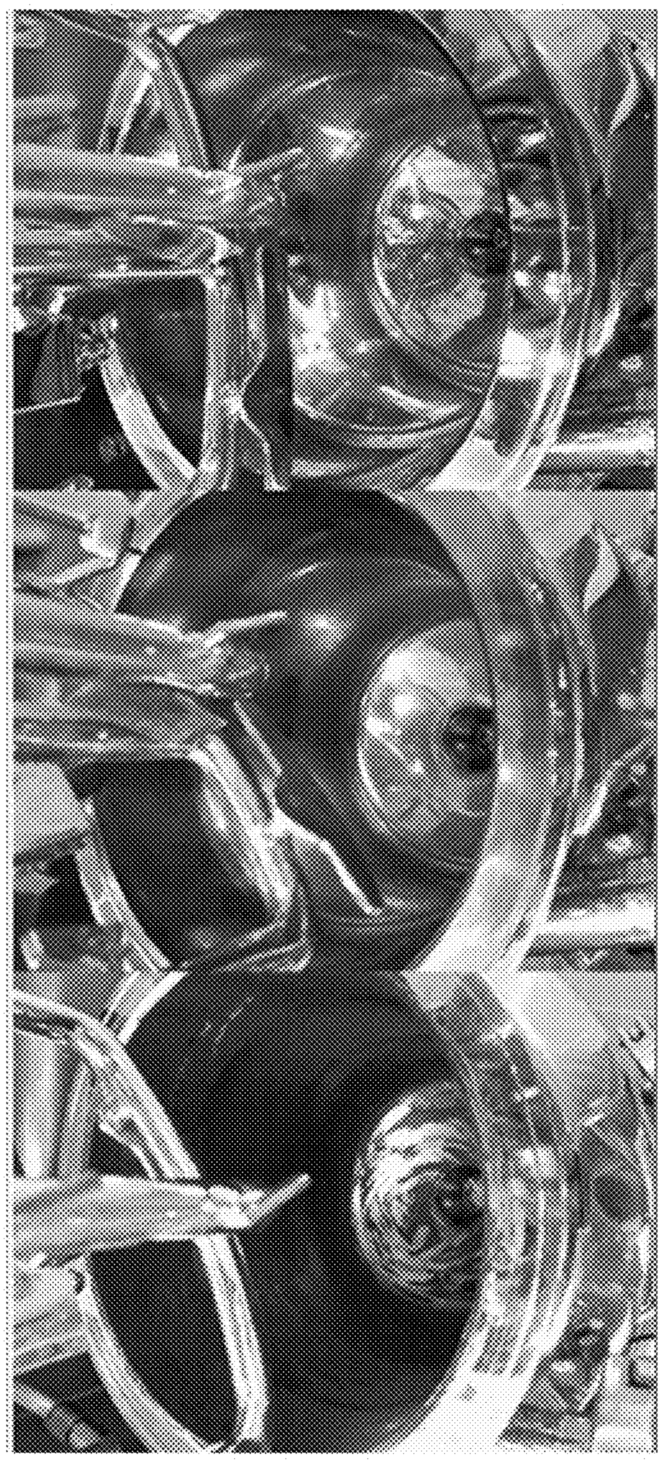
FIGS. 9A-9C show cleaning of lipstick with the cleaning system, where

FIG. 9A shows the soiled vessel. FIG. 9B shows the cleaning of lipstick with the cleaning system after 10 minutes, and then FIG. 9C shows removal of the soils following a water rinse of the vessel after the cleaning. In comparison FIGS. 10A-10D show the comparison of using Commercial product E, which left significant residual soil behind even after 30 minutes cleaning time (See FIGS. 10B (10 minutes), 10C (20 minutes) and 10D (30 minutes)).

Figures 10A, 10B, 10C, 10D:
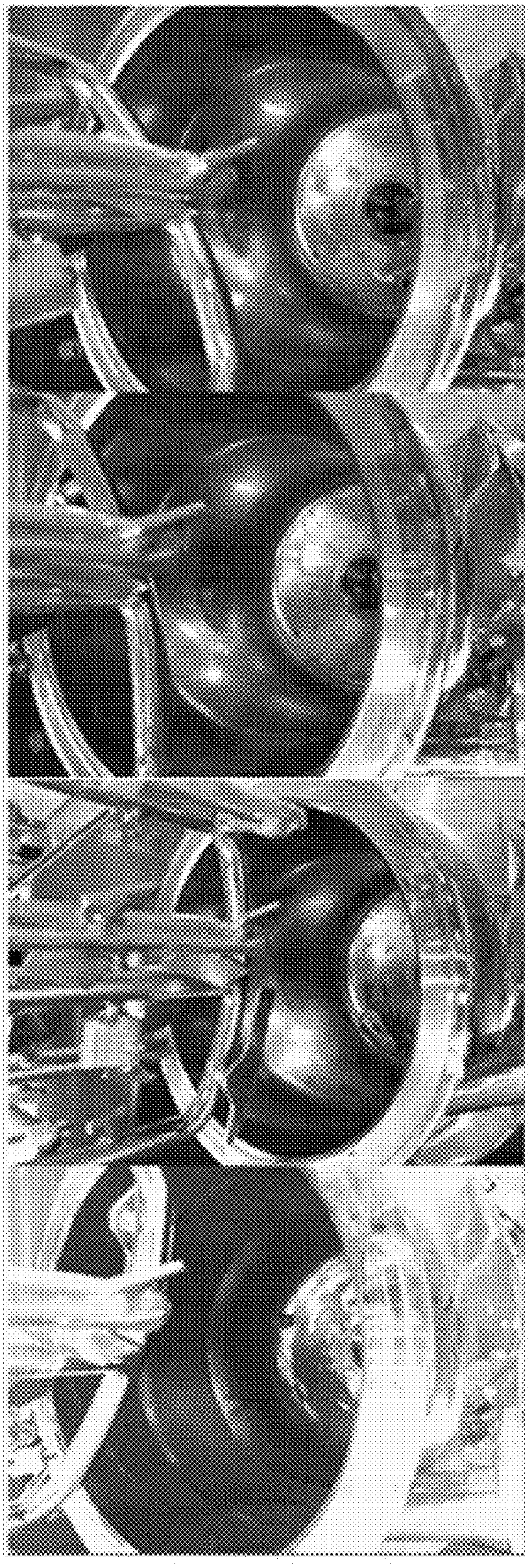
FIGS. 10A-10D show cleaning of lipstick with a commercial control product, demonstrating improved cleaning using the cleaning system (shown in FIGS. 9B-9C), where

FIGS. 10A-10D show cleaning of lipstick with a commercial control product, to demonstrating improved cleaning using the cleaning system (shown in FIGS. 9B-9C), where FIG. 10A shows the vessel soiled with lipstick before any cleaning, FIG. 10B shows removal of soils after 10 minutes cleaning with Commercial product E, FIG. 10C shows removal of soils after 20 minutes cleaning with Commercial product E, and FIG. 10D shows removal of the soils following 30 minutes cleaning with Commercial product E.

Figure 11A:
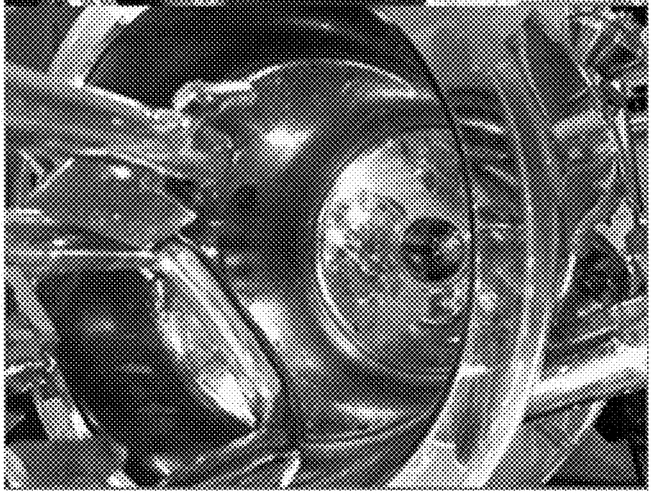
FIGS. 11A-11C show the additive cleaning of the lipstick from FIGS. 10A-10D, where
Figure 11B:
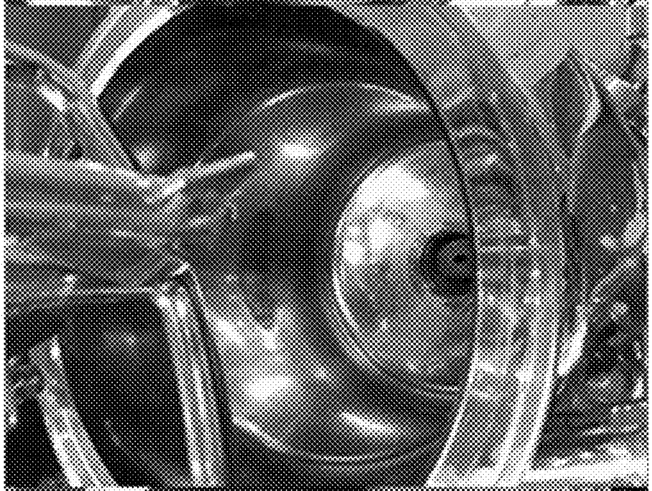
Figure 11C:
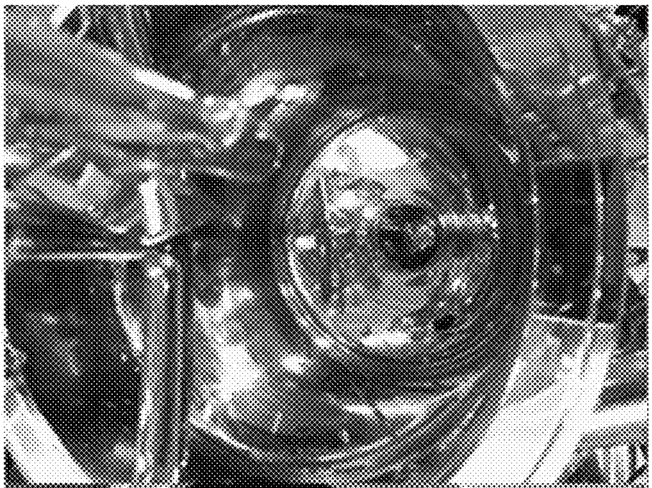

To further demonstrate the efficacy of the cleaning systems, FIGS. 11A-11C show the additive cleaning of the lipstick from FIGS. 10A-10D, where FIG. 11A shows the incomplete removal of lipstick soil with a water rinse after the 30 minutes with Commercial product E, FIG. 11B shows 100% cleaning efficacy of the same soiled vessel after only 10 minutes cleaning with the cleaning system, and finally FIG. 11C shows removal of the soils following a water rinse of the vessel after the cleaning in FIG. 11B.

It is to be understood that while the invention has been described in conjunction with the detailed description thereof, the foregoing description is intended to illustrate, and not limit the scope of the invention, which is defined by the scope of the appended claims. Other embodiments, advantages, and modifications are within the scope of the following claims. In addition, the contents of all patent publications discussed supra are incorporated in their entirety by this reference.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A cleaning system comprising:

(a) a detergent composition comprising:

about 10 wt-% to about 20 wt-% on an actives basis of an amine oxide surfactant; and about 10 wt-% to about 30 wt-% on an actives basis of at least two alcohol ethoxylate surfactants, wherein a first alcohol ethoxylate is a C8-C11 alcohol ethoxylate and a second alcohol ethoxylate is a C12-C20 alcohol ethoxylate, and wherein the alcohol ethoxylate surfactants comprise a mixture of linear and branched structures, and 40 wt-% to about 70 wt-% water, wherein pH of the detergent composition is from about 6 to about 8, wherein the detergent composition is free of organic and inorganic solvents; and (b) a builder composition comprising:

about 20 wt-% to about 30 wt-% on an actives basis of an alkalinity source;

about 5 wt-% to about 10 wt-% on an actives basis of at least one chelant; and 40 wt-% to about 75 wt-% water, wherein the detergent composition provides surfactants separate from the builder composition comprising the alkalinity source, and wherein the detergent composition is physically separate from the builder composition.

2. The system of claim 1, wherein the amine oxide of the detergent composition is a dimethyl amine oxide, or an octyl, decyl, dodecyl, isododecyl, coconut, or tallow alkyl di-(lower alkyl) amine oxide.

3. The system of claim 2, wherein the dimethyl amine oxide is lauryl dimethyl amine oxide, myristyl dimethyl amine oxide, or cetyl dimethyl amine oxide.

4. The system of claim 1, wherein the first alcohol ethoxylate of the detergent composition is linear and/or branched and has between about 4 and about 20 moles of ethylene oxide, and wherein the second alcohol ethoxylate of the detergent composition is linear and/or branched and has between about 6 and about 20 moles of ethylene oxide.

5. The system of claim 1, wherein the first alcohol ethoxylate of the detergent composition is a C9-C11 linear and/or branched alcohol ethoxylate and has between about 4 and about 15 moles of ethylene oxide, and wherein the second alcohol ethoxylate of the detergent composition is a C12-C16 linear and/or branched alcohol ethoxylate and has between about 6 and about 12 moles of ethylene oxide.

6. The system of claim 1, wherein the detergent composition comprises one C8-C11 alcohol ethoxylate and two C12-C20 alcohol ethoxylates, wherein one of the C12-C20 alcohol ethoxylates is linear and one of the C12-C20 alcohol ethoxylates is branched.

7. The system of claim 6, wherein the C8-C11 alcohol ethoxylate is partially linear and partially branched.

8. The system of claim 6, wherein the C8-C11 alcohol ethoxylate comprises from about 2 wt-% to about 10 wt-% on an actives basis of the detergent composition, and the C12-C20 alcohol ethoxylate comprises from about 8 wt-% to about 30 wt-% on an actives basis of the composition.

9. The system of claim 1, wherein the detergent composition further comprises an additional functional ingredient in an amount from about 0.01 wt-% to about 20 wt %.

10. The system of claim 1, wherein the alkalinity source in the builder composition comprises an inorganic and/or organic alkalinity source.

11. The system of claim 1, wherein the chelant in the builder composition comprises a polycarboxylic acid polymer, aminocarboxylate, aminocarboxylic acid, phosphonate, phosphonic acid, or combination thereof.

12. The system of claim 1, further comprising a booster, wherein the booster is an acid, an oxidant, sanitizer, or combination thereof.

13. A method of cleaning cosmetic soils comprising:

contacting a surface in need of soil removal with the detergent composition and the builder composition according to claim 1; and removing cosmetic soils from the surface.

14. The method of claim 13, wherein the detergent composition is applied at a use solution concentration of from about 0.5% to about 8%.

15. The method of claim 13, wherein the ratio of the builder composition to the detergent composition in the cleaning system is from about 1:1 to about 5:1, greater than 1:1, or greater than 2:1.

16. The method of claim 13, wherein the surface is soaked in the cleaning system, and optionally wherein agitation and/or mechanical force is employed to assist in removing the soils.

17. The method of claim 13, wherein a rinse step follows the contacting of the surface with the cleaning system, and optionally wherein no agitation and/or mechanical force is applied to the surface.

18. The method of claim 13, wherein the cleaning system is applied at elevated temperature.

* * * * *